Dec. 12, 1961 W. B. SCHOTT ET AL 3,012,258
WASHER AND SCREW ASSEMBLY MACHINE WITH ELECTRIC
CONTROL CIRCUIT COMPLETED BY CURRENT FLOWING
THROUGH WASHER AT ASSEMBLY STATION
Filed Sept. 26, 1957 6 Sheets-Sheet 1

INVENTORS
WARREN B. SCHOTT
JOHN E. MURPHY
ANTHONY E. DiMAIO
RALPH G. CARLSON
BY
ATTORNEYS

INVENTORS
WARREN B. SCHOTT
JOHN E. MURPHY
ANTHONY E. DiMAIO
RALPH G. CARLSON
ATTORNEYS

Dec. 12, 1961  W. B. SCHOTT ET AL  3,012,258
WASHER AND SCREW ASSEMBLY MACHINE WITH ELECTRIC
CONTROL CIRCUIT COMPLETED BY CURRENT FLOWING
THROUGH WASHER AT ASSEMBLY STATION
Filed Sept. 26, 1957  6 Sheets-Sheet 5

INVENTORS
WARREN B. SCHOTT
JOHN E. MURPHY
ANTHONY E. DiMAIO
RALPH G. CARLSON
BY
ATTORNEYS

Dec. 12, 1961 W. B. SCHOTT ET AL 3,012,258
WASHER AND SCREW ASSEMBLY MACHINE WITH ELECTRIC
CONTROL CIRCUIT COMPLETED BY CURRENT FLOWING
THROUGH WASHER AT ASSEMBLY STATION
Filed Sept. 26, 1957 6 Sheets-Sheet 6

INVENTORS
WARREN B. SCHOTT
JOHN E. MURPHY
ANTHONY E. DiMAIO
RALPH G. CARLSON
BY Kenway, Jenney, Witter & Hildreth.
ATTORNEYS United States Patent Office 3,012,258
Patented Dec. 12, 1961

3,012,258
WASHER AND SCREW ASSEMBLY MACHINE WITH ELECTRIC CONTROL CIRCUIT COMPLETED BY CURRENT FLOWING THROUGH WASHER AT ASSEMBLY STATION
Warren B. Schott, Topsfield, John E. Murphy, Brockton, Anthony E. Di Maio, Chelsea, and Ralph G. Carlson, Westwood, Mass., assignors to L. J. Barwood Manufacturing Co. Inc., Everett, Mass., a corporation of Massachusetts
Filed Sept. 26, 1957, Ser. No. 686,472
8 Claims. (Cl. 10—155)

This invention comprises a new and improved machine for automatically assembling fastener units, particularly units that include a composite washer provided with a flexible or plastic sealing ring and a threaded screw or bolt.

Heretofore considerable difficulty has been encountered in assembling units of this type without damage to the sealing ring since in its most advantageous position it must lie concentrically with respect to the hole of the washer and slightly overlap the inner circumference thereof. Under such conditions the thread of the screw or bolt is likely to shear or broach portions of the sealing ring or to displace it into unsymmetrical position. Either of these mischances results in a defective fastener, that is, one which will not produce a water-tight joint when used.

We have succeeded in obviating this defect by providing means for immovably suspending the screws or bolts one by one in a positively determined vertical position, and then threading a composite washer on each screw by upward movement in a washer-carrying plunger. The accuracy of the assembling operation is such that no damage is done to the flexible sealing ring and the washer is always seated firmly against the under face of the screw or bolt head.

In our improved machine as herein shown, the successive steps of its cycle are electrically controlled and one important feature of our invention consists in utilizing the washer itself as part of the controlling circuit for operating the screw or bolt delivering and holding members of the machine.

Another feature consists in employing one of the screw-holding members to initiate movement of the washer-carrying plunger and to time it to take place when the screw has been positioned to receive a washer.

Still another feature consists in the combination of solenoid operated means for determining positively and gauging the operative position of the screw or bolt. This is accomplished as herein shown by providing a screw-locating member that is moved into contact with a solid stop by solenoid action in positioning each screw and maintained by holding current through the solenoid under pressure against the stop during the assembling step.

An important characteristic of our invention is that the consecutive steps of delivering successive screws or bolts and successive composite washers, positioning them, assembling them in unit relation, and releasing the completed unit are carried out by electrical means actuated automatically one after another in this proper-timed order and relation.

These and other features of the invention will be best understood and appreciated from the following description of a preferred embodiment thereof selected for purposes of illustration and shown in the accompanying drawings in which.

Figure 4:
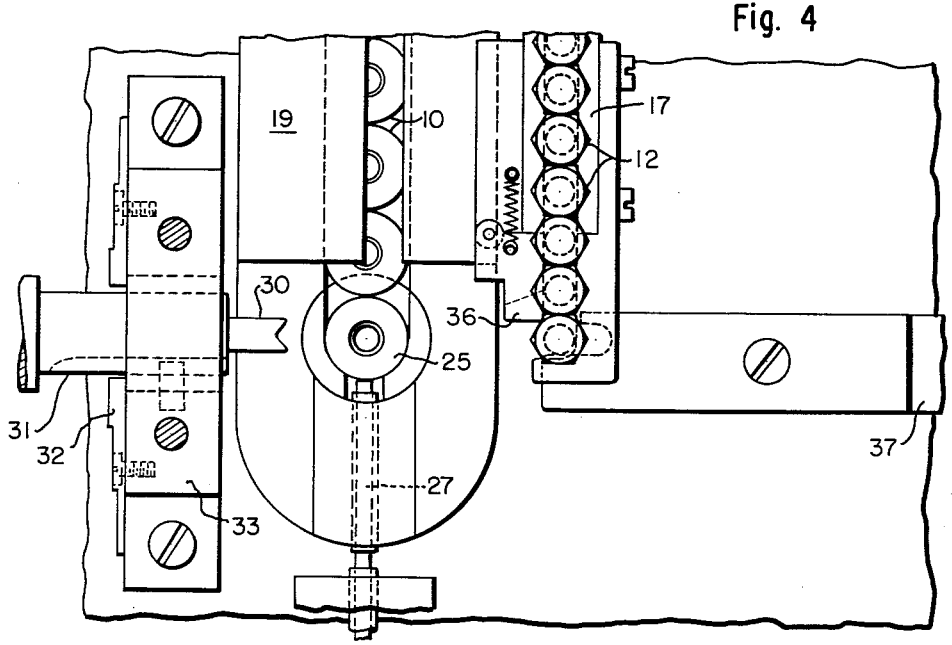
Figure 5:
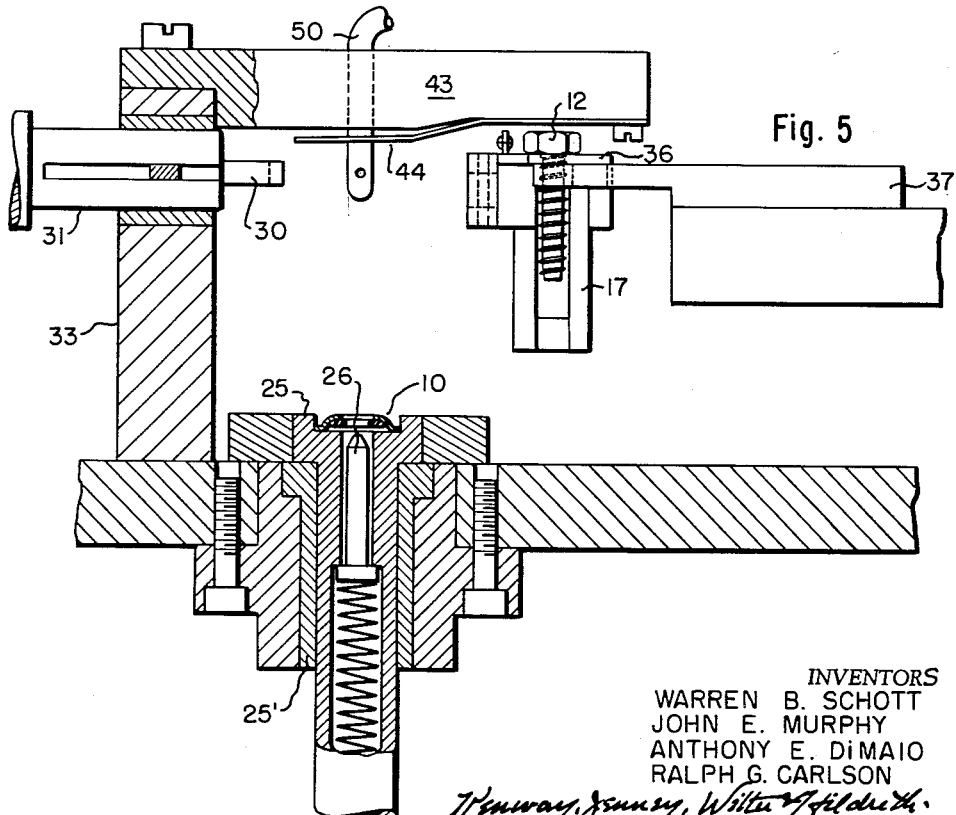
Figure 6:
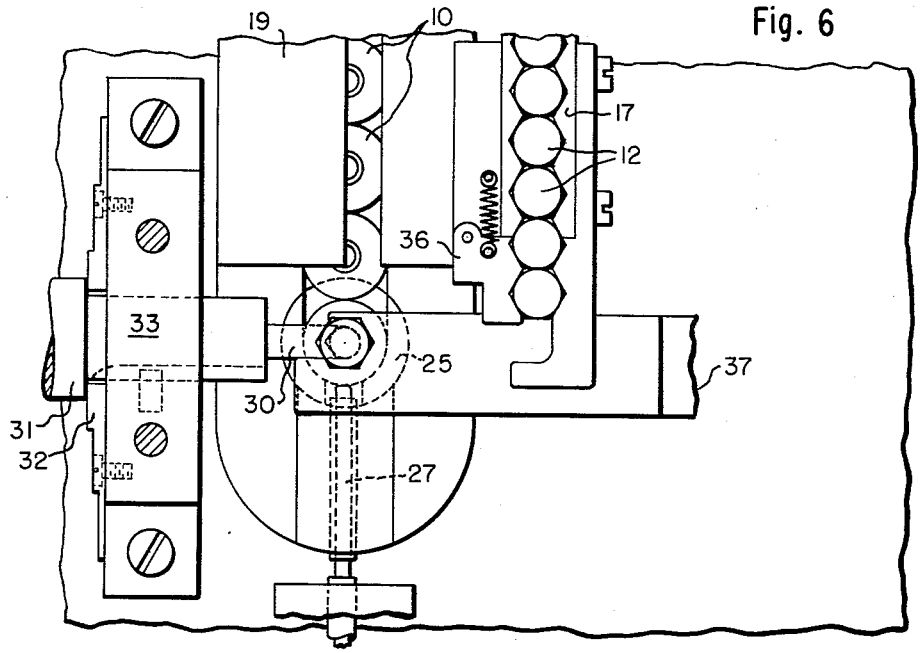
Figure 7:
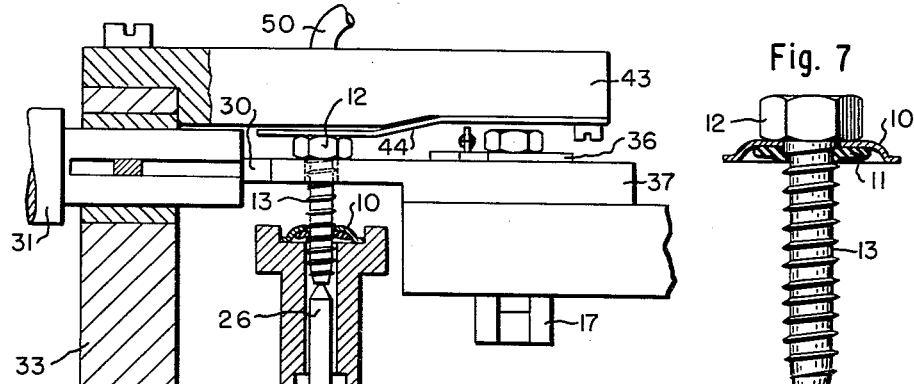
Figure 8:
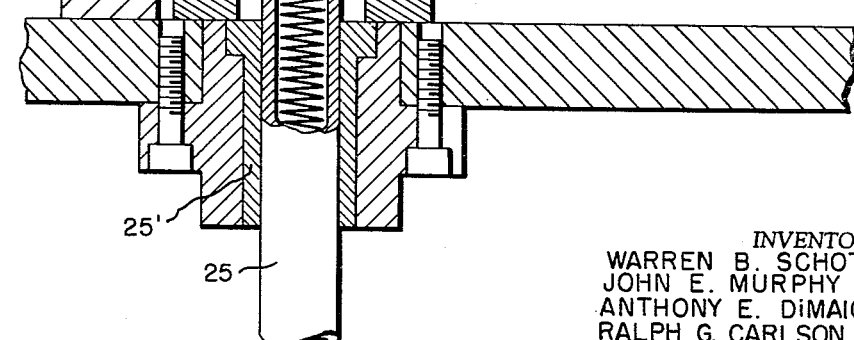
Figure 9:
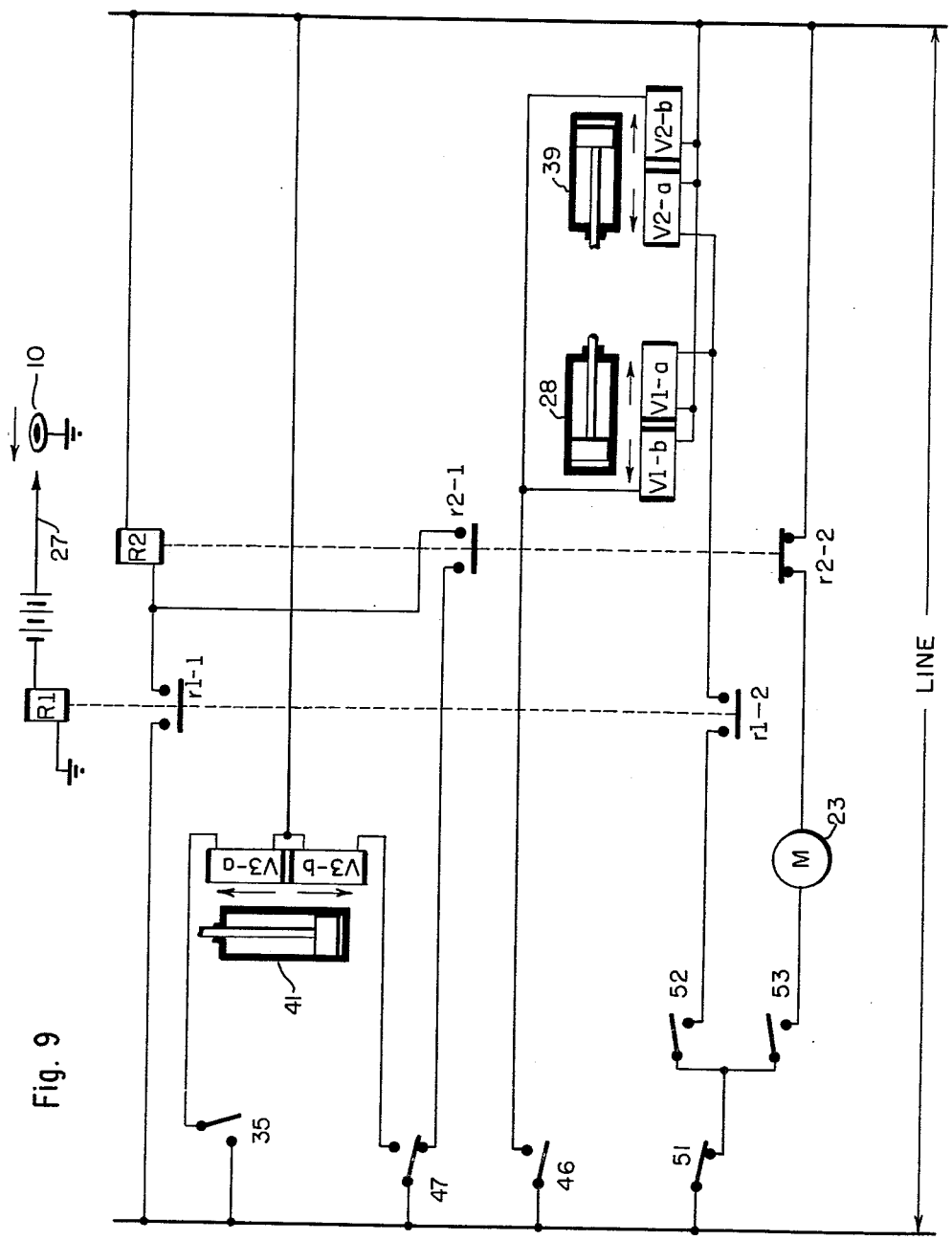

FIG. 4 is a plan view on an enlarged scale of the operative parts of the machine showing a washer in position preparatory to the assembling step, FIG. 5 is a corresponding view in elevation, partly in section, FIG. 6 is a plan view corresponding to FIG. 4 but showing the screw in position for the assembling step, FIG. 7 is a view of one of the fastener units shown partly in section, FIG. 8 is a view in elevation, partly in section, corresponding to FIG. 6, and FIG. 9 is a wiring diagram of the machine.

The fastener unit shown in FIG. 7 comprises a dished metal washer 10 having a ring 11 of flexible sealing material secured to its under face concentrically with the hole of the washer, together with a threaded screw or bolt having a hexagonal head 12 and a threaded shank 13. From the main frame of the machine projects a post or standard 15 carrying at its upper end a magazine 16 for screws leading to a raceway 17. Beneath this magazine is mounted a magazine 18 for the composite washers and this leads to a substantially horizontal raceway 19. Both magazines are of the Syntron type. They are each adapted to contain an ample supply of the respective components and are subjected to high frequency vibration which causes the parts to be assorted and delivered in the proper position to the communicating raceways. These magazines are commercial articles available in the open market and in themselves constitute no part of the present invention.

Figure 2:
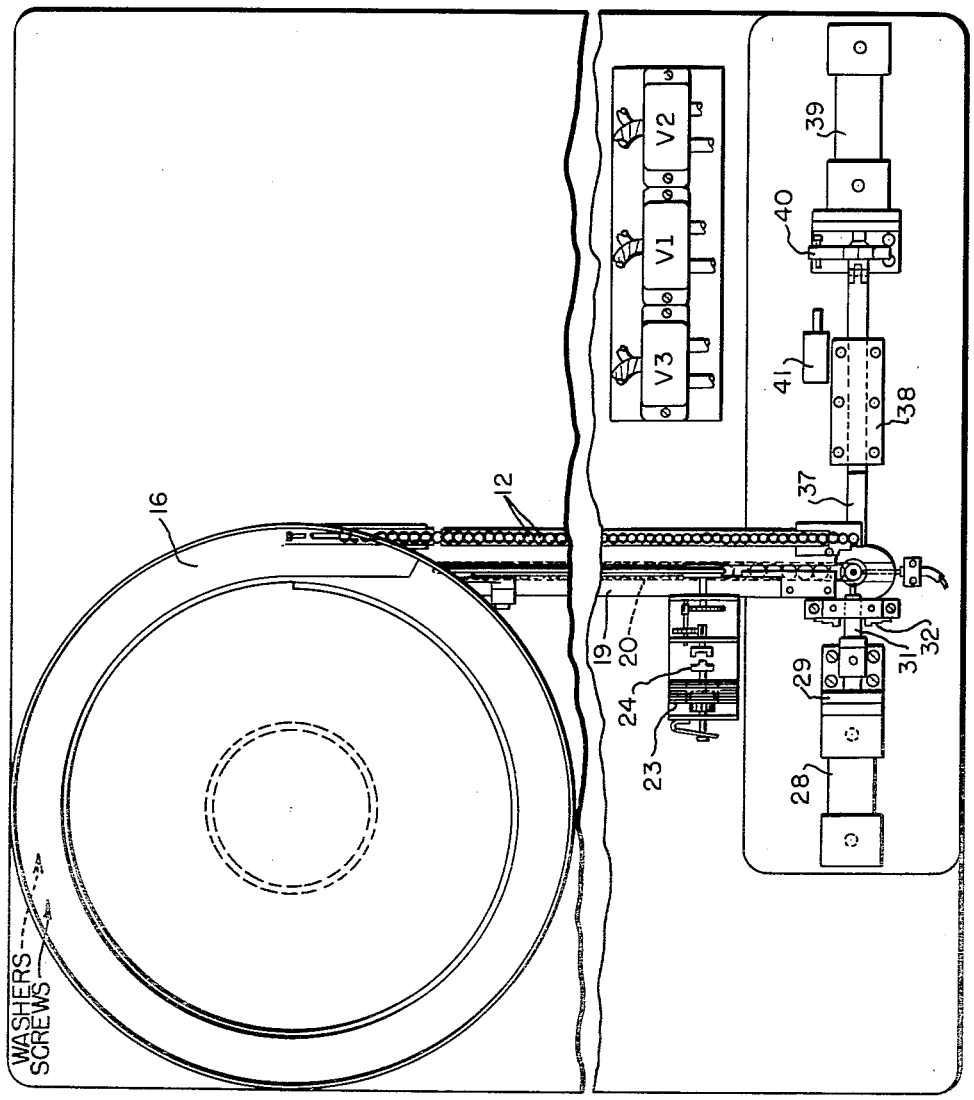
FIG. 2 is a plan view.

As the washers 10 pass from the magazine 18 to the raceway 19 they are engaged from above and advanced by an endless belt 20 preferably of rubber and arranged to run about an idle roll 21 mounted adjacent to the hopper 18, and a driven roll 22 mounted above the raceway adjacent to its delivery end. The driven roll 22 is connected through gearing to an individual motor 23 as seen in FIG. 2. Between the motor and the gearing is provided a clutch 24 and this is arranged to disengage when the current to the motor is cut off so that the belt 20 will immediately stop.

The washers are advanced one by one by the action of the belt 20 to a U-shaped recess formed in the upper end of a plunger 25, best shown in FIGS. 5 and 8, and arranged to reciprocate vertically in a bushing 25' mounted in the machine frame. The plunger 25 carries a spring centering pin 26 and in its front side is formed an open vertical keyway to permit the passage of a contact pin 27 mounted in a block secured to the table. This pin is arranged to close an electric circuit through contact with the washer which circuit is arranged to energize a solenoid 28 mounted on an angle bracket 29 secured to the frame of the machine and acting when energized to advance to a definite predetermined point a forked stop or screw locating member 30 carried by a plunger 31 which is connected to the core of the solenoid 28.

The plunger 31 is provided with a shoulder which is arranged to make positive contact with a stepped bumper 32 adjustably secured to a bearing bracket 33 through which the reduced portion of the plunger reciprocates. In FIG. 6 the shoulder of the plunger 31 is shown as engaged with the stop 32 and the forked end of the plunger 30 is thus located in the desired predetermined position for the assembling operation. It will be apparent that the solenoid 28 when energized will act to advance the plunger 31 with the stop 30 quickly into the desired positively predetermined position and that contact pin 27 will detect any failure of washer delivery and so interrupt the routine cycle of the machine.

The solenoid 28 is double acting. When energized by closing of the circuit through the washer 10 it moves the plunger 31 to the right and holds its shoulder against the positive stop 32 as long as the washer remains in contact with the pin 27. When the washer is removed, as will presently appear, a reversing circuit in the solenoid is energized and the plunger returned to its initial position.

Figure 1:
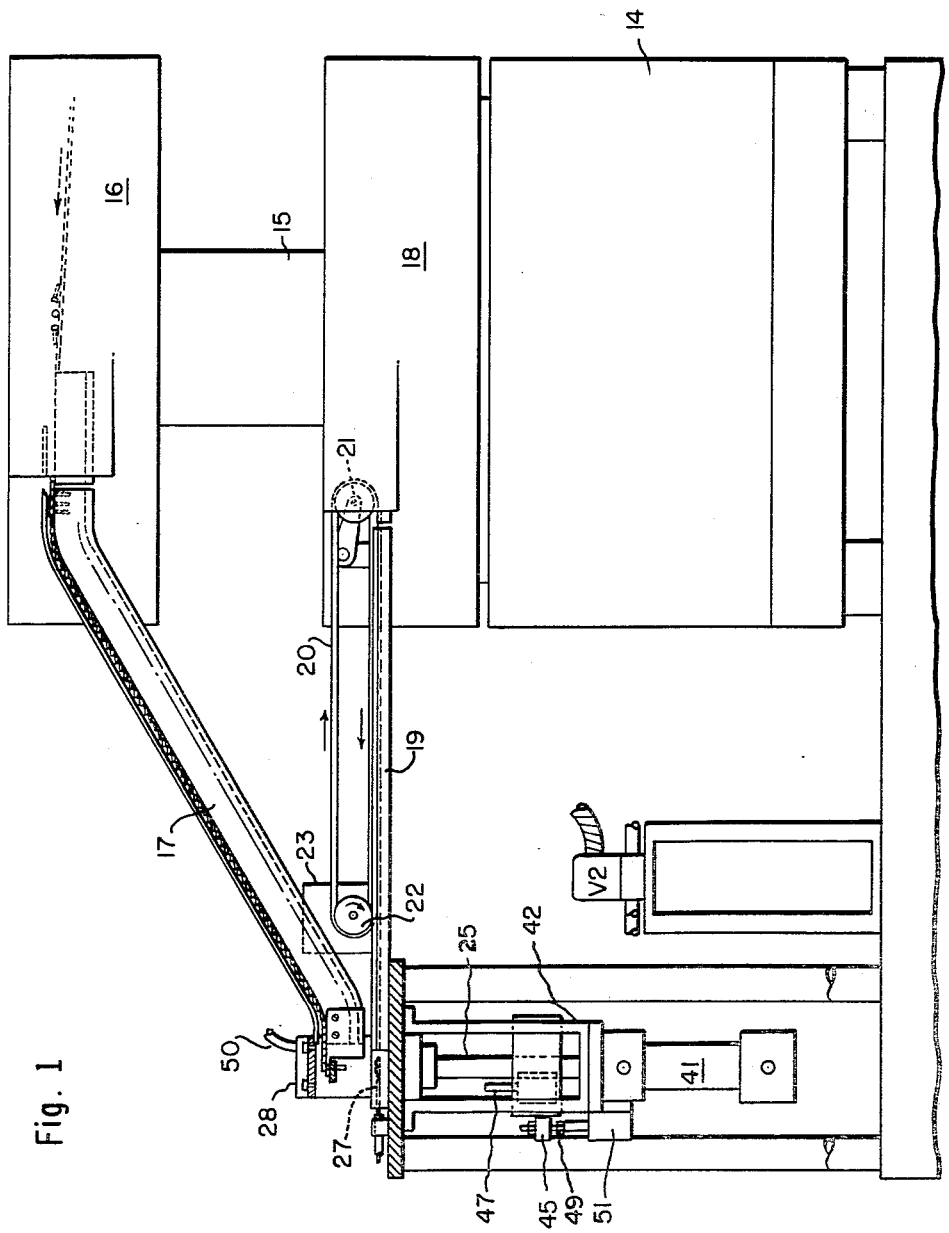
FIG. 1 is a view in side elevation with certain parts shown in section.
Figure 3:
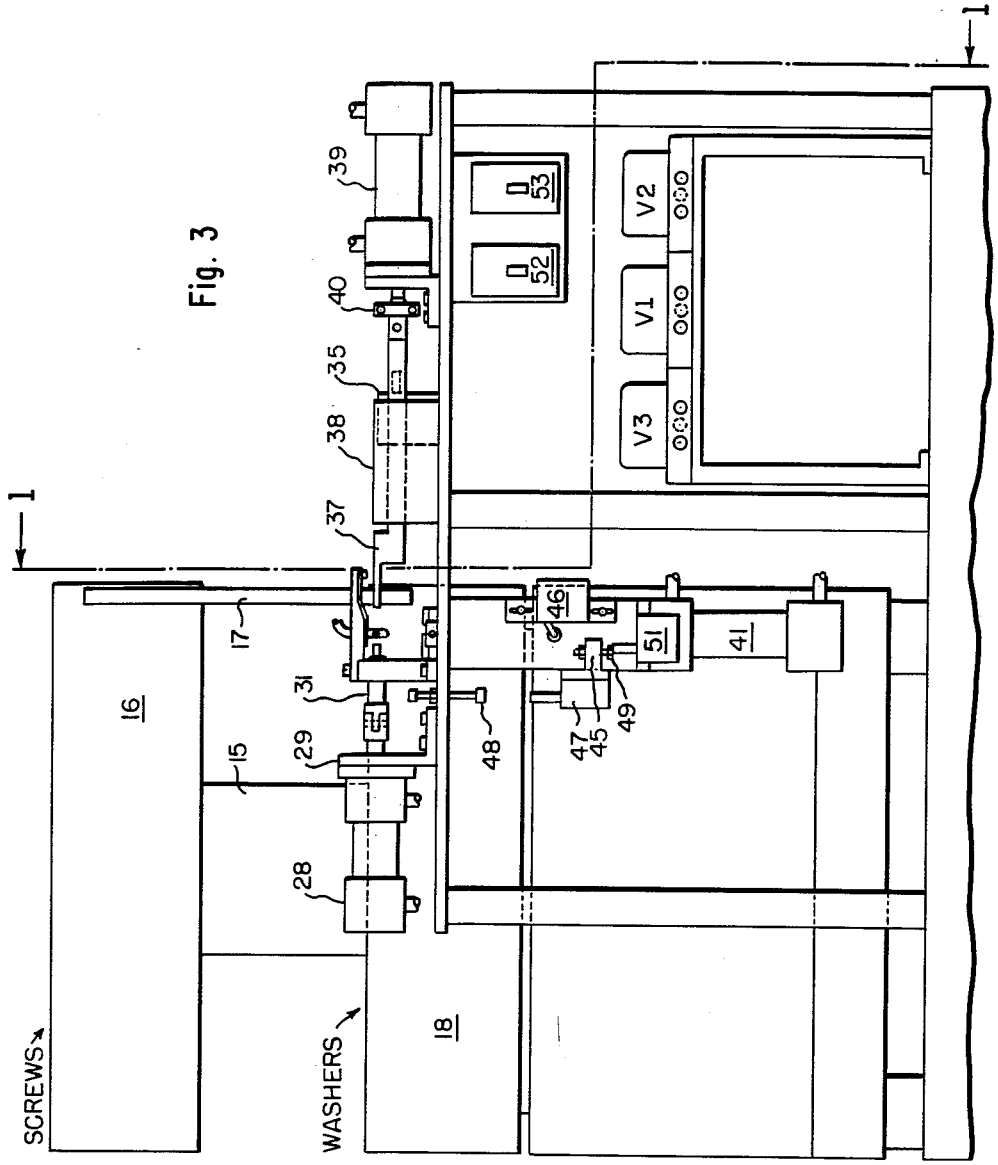
FIG. 3 is a view in front elevation.

The screws pass progressively down the inclined raceway 17 by gravity being supported in the raceway by their heads 12 and these pass freely under a cover strip shown in FIGS. 1 and 3 but omitted in FIGS. 4 and 6. A spring operated dog 36 mounted on the raceway yieldingly retains the two lowest screws at the end of the raceway.

A feed slide 37 is arranged to reciprocate horizontally in a bearing bracket 38 secured to the machine frame. Its outer end is connected to the core of a double acting solenoid 39 through a head 40 carrying an adjustable pin so located as to engage and trip a switch 35 in each forward stroke. The slide 37 is forked at its screw-engaging end and in its initial position, as shown in FIG. 4, the longer fork of the slide arrests the movement of the screws from the raceway 17 and provides a pocket for the endmost screw as it emerges from the raceway end. As the slide 37 advances it carries this screw in the pocket suspended by its head toward the left in FIGS. 4 and 6 until the shank of the screw is arrested and firmly engaged by the forked locating stop 30. The screw is thus held positively suspended in predetermined stationary position, its shank being clamped by engagement of the stop 30 and the slide 37 immediately beneath the head 12, thus holding the screw stationary and in line with the axis of the lower plunger 25 and the washer 10 thereon.

As the slide 37 is advanced toward the left the switch 35 is tripped and this is in circuit with a compressed air valve V3 which controls and directs energizing current to the opposite ends of a vertically disposed double acting solenoid 41 mounted on the lower end of a yoke 42 fast to the machine frame with its core connected to the lower end of the plunger 25. The switch 35 operates the valve V3 causing it to direct the energizing current to the upper end of the solenoid 41 thereby lifting the plunger 25 with its washer upwardly, threading the washer upon the shank of the screw and forcing it upwardly until it is seated against the under side of the head 12 of the screw held rigidly above it. The assembling operation is thus completed.

In its movement from initial position, as shown in FIGS. 4 and 5, to final position, as shown in FIGS. 6 and 8, the slide 37 carries the head 12 of the screw forwardly beneath a stationary horizontal bar 43 fast to the machine frame and carrying an underlying leaf spring 44. This spring is deflected upwardly by the screw head and cooperates with the spring pin 26 to hold the assembled unit momentarily in position when the locating stop 30 and the slide 37 begin to retract. The spring 44 and the bar 43 constitute means for backing up the screw during the assembling step.

The plunger 25 carries a rounded lug 45 arranged to trip a switch 46 adjustably mounted on the frame and in circuit with compressed air valves V1 and V2 controlling current to the horizontal solenoids 28 and 39. The lug is effective to throw the switch 46 near the upper end of the travel of the plunger 25, directing energizing currents to the outer ends of the two solenoids and and causing the stop 30 and slide 37 to retract and release the assembled unit to remain in its position shown in FIG. 8.

A compressed air nozzle 50 is arranged to discharge immediately behind the unit as held by the leaf spring 44 and the spring pin 26. When the plunger 25 has descended sufficiently to release the pressure of the pin 26 the blast of air from the nozzle 50 is effective to blow the unit into a discharge chute located adjacent to the plunger but not herein shown.

The plunger 25 carries a switch 47 which is so located as to encounter an adjustable stop pin 48 set in the machine frame in position to throw the switch 47 when the plunger 25 reaches the top of its stroke at the conclusion of the assembling step. The switch 47 is in circuit with the valve V3 and when tripped by the pin 48 operates the valve, causing it to direct current to the lower end of the solenoid and so to retract the plunger.

The lug 45 carries an adjustable pin 49 arranged to throw a switch 51 fixed to the machine frame adjacent to the path of the plunger at the lower end of its travel. This switch 51 is in circuit with the motor 23 for the washer feeding belt 20 and a relay R1 shown in the wiring diagram as controlling relay switches in circuit with all three valves V1, V2 and V3.

The normal cycle of the machine will be clear from the foregoing description in connection with the diagram of FIG. 9. The circuits include two main manually operated switches 52 and 53 which must be closed by hand in order to start the machine. The switch 51 is shown as initially occupying its closed position as does also relay switch R2. Accordingly it will be seen that upon closing the switch 52 and 53 the belt 20 will be operated to advance a washer 10 into its seat in the plunger 25 and into contact with the contact pin 27. This closes the washer circuit, and energizes the relay R1, closing relay switches $r1$–1 and $r1$–2 as shown in FIG. 9. The closing of relay switch $r1$–1 passes energizing current to relay R2 and closes relay switch $r2$–1 in circuit with the valves V1 and V2. The valves V1 and V2 are immediately operated to direct energizing currents to the solenoids 28 and 39 for placing a screw in assembling position and in this movement the switch 35 is thrown and the plunger 25 elevated.

The relay R2 at the same time opens the switch $r2$–2 stopping the motor 23 of the washer feeding belt and closes the switch $r2$–1 so that when the switch 47 is closed the solenoid 41 will be actuated to lower the plunger 25 and maintain a holding current so that the plunger will be maintained in position to receive another washer from the raceway 19. When that washer is received the washer circuit is again closed and the cycle is repeated.

While the machine has been illustrated as dealing with a fastener unit including as one component a bolt of the type shown in FIG. 7, it will be understood that with minor changes the machine may be adapted for handling units including any type of headed fastener, all within the scope of our invention.

Having thus disclosed the said invention and described in detail an illustrative embodiment thereof, we claim as new and desire to secure by Letters Patent:

1. A fastener unit assembling machine comprising means for assorting and presenting one after another in assembling position composite washers of metal and plastic material, means for delivering screws in assembling position, a stop movable to determine the assembling position of each screw as delivered and also to be retracted after the assembly operation in order to permit discharge of the assembled unit, an electric control system for said washer-presenting means and for said stop including electrically operated means for advancing the stop to a predetermined operative position, connections supplying an operating current for actuating said stop-advancing means, and contact means for setting the control system in action by current flowing through the metal of a washer when the washer is present in the said assembling position.

2. A fastener unit assembling machine as described in claim 1, further characterized in that it includes means for adjustably and positively determining the operative position of the said stop in the screw-delivering action of the machine.

3. A machine as described in claim 1 having a solenoid for advancing the screw-delivering slides until the slide is arrested by the action of the said opposed screw-locating stop.

4. A machine as described in claim 1 having a reciprocating plunger with a seat in its upper end to which a washer is delivered and an open slot in one side, together with a contact pin projecting into said slot to contact the washer located in said seat in a predetermined position of the plunger.

5. A machine for assembling screws and washers of metal and plastic material, comprising a raceway and a motor-operated endless belt for delivering washers successively to a predetermined assembling position, a raceway for screws and an electric control system including a pair of opposed solenoid-operated slides for delivering one screw at a time from the raceway to said assembling position, means for backing up each screw during the delivering step, a solenoid-operated plunger movable to thread a delivered washer upon a delivered screw, activating circuits including the belt operating motor and both of the said solenoids having automatically operated contacts in each circuit, and contact means for setting the control system in action by current flowing through the metal of a washer when the washer is present in the said assembling position.

6. A machine for assembling screws and composite washers of metal and plastic material, comprising a vertically movable plunger, a raceway for delivering successive washers to the plunger in its lowermost position, a forked stop and a feed slide movable toward and from each other at a level above the path of the plunger for presenting successive screws in assembling position, means for backing up each screw during the delivering step, a solenoid operatively connected to the plunger, an electric control system including an activating circuit and a switch located adjacent to and operated by the said feed slide in its inward movement, and contract means for setting the control system in action by current flowing through the metal of a washer when the washer is present in said assembling position.

7. A machine for assembling screws and composite washers, comprising means for backing up and holding a screw suspended in stationary position with its shank projecting into free space, a washer-carrying plunger movable toward and from a screw while thus suspended, a washer raceway leading to said plunger, an electric control system having therein a combined stop and contact pin located to engage successive washers as delivered to said plunger and included in an electric circuit with a delivered washer, and an actuating solenoid for the plunger activated by said circuit, said contact pin acting to set the control system in action by current flowing through the washer when it is present in the said assembling position.

8. A screw and washer assembling machine comprising a washer-carrying plunger movable in a vertical path, a washer raceway leading to the plunger in its initial position for delivering a washer thereto, and an electric contact member located in position to engage a washer as delivered to the plunger and included in an electric circuit with a delivered washer on the plunger, the washer forming a part of the electric circuit, and a switch operated by the electric circuit through the washer for carrying out the routine cycle of the machine except on failure of a washer to present itself to the plunger and to serve as a part of said circuit.

References Cited in the file of this patent

UNITED STATES PATENTS

| | | |
|---|---|---|
| 2,284,690 | Stern | June 2, 1942 |
| 2,509,056 | Gartner | May 23, 1950 |
| 2,514,775 | Mackintosh | July 11, 1950 |
| 2,596,109 | Abbott | May 13, 1952 |
| 2,613,374 | Gora | Oct. 14, 1952 |
| 2,711,550 | Nielsen | June 28, 1955 |
| 2,728,091 | Hoenk | Dec. 27, 1955 |
| 2,732,570 | Carpenter | Jan. 31, 1956 |
| 2,803,377 | Wilson | Aug. 20, 1957 |
| 2,878,556 | Heidergott | Mar. 24, 1959 |
| 2,910,768 | Heidergott | Nov. 3, 1959 |
| 2,931,095 | Esken | Apr. 5, 1960 |